(12) United States Patent
Wong

(10) Patent No.: US 8,151,017 B2
(45) Date of Patent: Apr. 3, 2012

(54) MULTIPLEXING APPLICATION AND DEBUG CHANNELS ON A SINGLE USB CONNECTION

(75) Inventor: Chi Kwok Wong, Shatin (HK)

(73) Assignee: Smartech World Wide Limited, Hong Kong (CN)

( * ) Notice: Subject to any disclaimer, the term of this patent is extended or adjusted under 35 U.S.C. 154(b) by 73 days.

(21) Appl. No.: 12/861,035

(22) Filed: Aug. 23, 2010

(65) Prior Publication Data

US 2012/0047295 A1 Feb. 23, 2012

(51) Int. Cl.
*G06F 3/00* (2006.01)
*G06F 5/00* (2006.01)

(52) U.S. Cl. .......... 710/51; 710/36; 710/313; 710/316; 714/724

(58) Field of Classification Search ........... 710/36–51, 710/305–317; 714/724–729, 734–742, 25–27
See application file for complete search history.

(56) References Cited

U.S. PATENT DOCUMENTS

| | | | |
|---|---|---|---|
| 6,370,635 B2 * | 4/2002 | Snyder | 712/32 |
| 6,389,560 B1 * | 5/2002 | Chew | 714/43 |
| 6,738,929 B2 | 5/2004 | Swoboda | |
| 6,895,576 B2 * | 5/2005 | Loughran et al. | 717/124 |
| 6,934,793 B2 * | 8/2005 | Ying et al. | 710/316 |
| 6,941,491 B2 * | 9/2005 | Chen | 714/25 |
| 7,149,636 B2 | 12/2006 | Cyran | |
| 7,401,257 B2 * | 7/2008 | Usui | 714/27 |
| 7,539,900 B1 | 5/2009 | Plofsky | |
| 7,823,133 B2 * | 10/2010 | Tamagno et al. | 717/127 |
| 7,861,119 B1 * | 12/2010 | Righi et al. | 714/38.1 |
| 7,870,455 B2 * | 1/2011 | Mayer | 714/734 |
| 8,010,843 B2 * | 8/2011 | Righi et al. | 714/32 |
| 8,078,785 B2 * | 12/2011 | Hou et al. | 710/307 |
| 8,078,856 B1 * | 12/2011 | Righi et al. | 713/1 |
| 8,086,922 B1 * | 12/2011 | Camarota | 714/725 |

\* cited by examiner

*Primary Examiner* — Christopher B Shin
(74) *Attorney, Agent, or Firm* — SV Patent Service

(57) ABSTRACT

A computer system for software development and debugging for an embedded system includes a Universal Serial Bus (USB), a host computer comprising a USB driver interfaced with the USB, wherein the USB driver can multiplex application data and debug data to and from the USB, and an embedded system comprising a USB module interfaced with the USB. The USB module can multiplex the application data and the debug data to and from the host computer via the USB.

15 Claims, 7 Drawing Sheets

MULTIPLEXING APPLICATION AND DEBUG CHANNELS ON A SINGLE USB CONNECTION

BACKGROUND OF THE INVENTION

The present disclosure relates to software development and debugging for embedded systems.

In embedded system software development, referring to FIG. 1, a conventional debugging system 100 includes a host computer 110 (in most cases, a personal computer) which is connected to an embedded system 130 (i.e. target system) by two separate connections: an application connection 140 and a debugging data path. The embedded system is an emulator for the functions of an integrated circuit for which the application is being developed. The application connection 140 can be connected with a USB (Universal Serial Bus) interface. The debugging data path usually includes a standard interface 150 such as a parallel port, a serial port, or a USB connection on the host computer 110 and a proprietary interface such as JTAG, SPI, etc. on the embedded system 130. An interface unit 120 is therefore usually required between the host computer 110 and the embedded system 130 to convert from the standard interface 150 to the proprietary interface 160. The interface unit 120 is used even for the embedded systems that have USB interfaces because the USB interface is dedicated to the application data communication for software development and thus cannot be used for debugging purposes.

Therefore, there is a need for a simpler and more convenient way for software development and debugging for embedded systems.

SUMMARY OF THE INVENTION

The present application discloses a new simplified approach for software development and debugging for embedded systems. The host computer and the embedded system are so configured such that a single USB connection can be used for application and debugging communications between a host computer and an embedded system with a built-in USB connection. The disclosed system can significantly simplify the hardware requirements and improve efficiency for software development and debugging for embedded systems. Moreover, the disclosed system no longer requires the embedded system to have dedicated I/O pins for a debugging channel. The I/O pins can thus be re-allocated for other purposes and reduced, which can be especially significant for embedded systems with low I/O pin count.

In a general aspect, the present invention relates to a computer system for software development and debugging for an embedded system. The computer system includes a Universal Serial Bus (USB); a host computer comprising a USB driver interfaced with the USB, wherein the USB driver is configured to multiplex application data and debug data to and from the USB; and an embedded system comprising a hardware USB module interfaced with the USB, wherein the USB module is configured to multiplex the application data and the debug data to and from the host computer via the USB.

Implementations of the system may include one or more of the following. The host computer can further include a debugger in communication with the USB driver, the debugger being configured to transmit the debug data to and from the USB driver. The debugger can transmit the debug data to and from the USB driver in vendor specific requests defined in USB protocols. The host computer can further include a filter driver in communication with the USB driver, the filter driver being configured to direct the debug data to and from the debugger. The host computer can further include an application module in communication with the USB driver, the application module being configured to transmit the application data to and from the USB driver. The application module can transmit the application data to and from the USB driver in USB transactions other than vendor specific requests defined in USB protocols. The host computer can include a function driver in communication with the USB driver, the function driver being configured to direct the application data to and from the application module. The embedded system can include a debug module in communication with the USB module, the debug module being configured to transmit the debug data to and from the USB module. The debug module can transmit the debug data to and from the USB module in vendor specific requests defined in USB protocols. The embedded system can include a debug request module in communication with the USB module and the debug module, wherein the debug request module can translate the vendor specific requests received from the USB module into debug commands and send the debug commands to the debug module, wherein the debug request module is configured to translate debug messages from the debug module into vendor specific requests to be sent to the USB module. The embedded system can further include a central processing unit configured to transmit the application data to and from the USB module, wherein the central processing unit can execute an application to produce the application data or execute an application in response to the application data.

In another general aspect, the present invention relates to a computer system for software development and debugging for an embedded system. The computer system includes a Universal Serial Bus (USB); a host computer comprising a USB driver interfaced with the USB, wherein the USB driver is configured to multiplex application data and debug data to and from the USB; and an embedded system that includes a USB device driver comprising an interrupt service routine in communication with the USB. The interrupt service routine is configured to multiplex application data and debug data to and from the USB.

Implementations of the system may include one or more of the following. The USB device driver can further include a debug monitor configured to transmit the debug data to and from the interrupt service routine, wherein the debug monitor is configured to process or produce the debug data. The debug monitor can transmit the debug data to and from the interrupt service routine in vendor specific requests defined in USB protocols. The embedded system can further include an application module configured to transmit the application data to and from the interrupt service routine, wherein the application module is configured to execute an application to produce the application data or execute an application in response to the application data. The USB device module can further include a request handler in communication with the interrupt service routine and the application module, wherein the request handler is configured to transmit the application data to and from the interrupt service routine and the application module in USB transactions other than vendor specific requests defined in USB protocols.

In another general aspect, the present invention relates to a computer system for software development and debugging for an embedded system. The computer system includes a host computer comprising: a Universal Serial Bus (USB) driver interfaced with a USB and configured to multiplex application data and debug data to and from the USB; a debugger in communication with the USB driver, the debugger being configured to transmit the debug data to and from the USB driver; and an application module in communication with the USB driver, the application module being configured to transmit the application data to and from the USB driver. The computer system also includes an embedded system comprising: a USB module interfaced with the USB, wherein the USB module is configured to multiplex the application data and the debug data to and from the host computer via the USB; a debug module configured to transmit the debug data to and from the USB module, the debug module being configured to process or produce the debug data; and a central processing unit configured to transmit the application data to and from the USB module, wherein the central processing unit is configured to execute an application to produce the application data or execute an application in response to the application data.

Although the invention has been particularly shown and described with reference to multiple embodiments, it will be understood by persons skilled in the relevant art that various changes in form and details can be made therein without departing from the spirit and scope of the invention.

BRIEF DESCRIPTION OF THE DRAWINGS

The following drawings, which are incorporated in and form a part of the specification, illustrate embodiments of the present invention and, together with the description, serve to explain the principles of the invention.

DETAILED DESCRIPTION OF THE INVENTION

Figure 1:
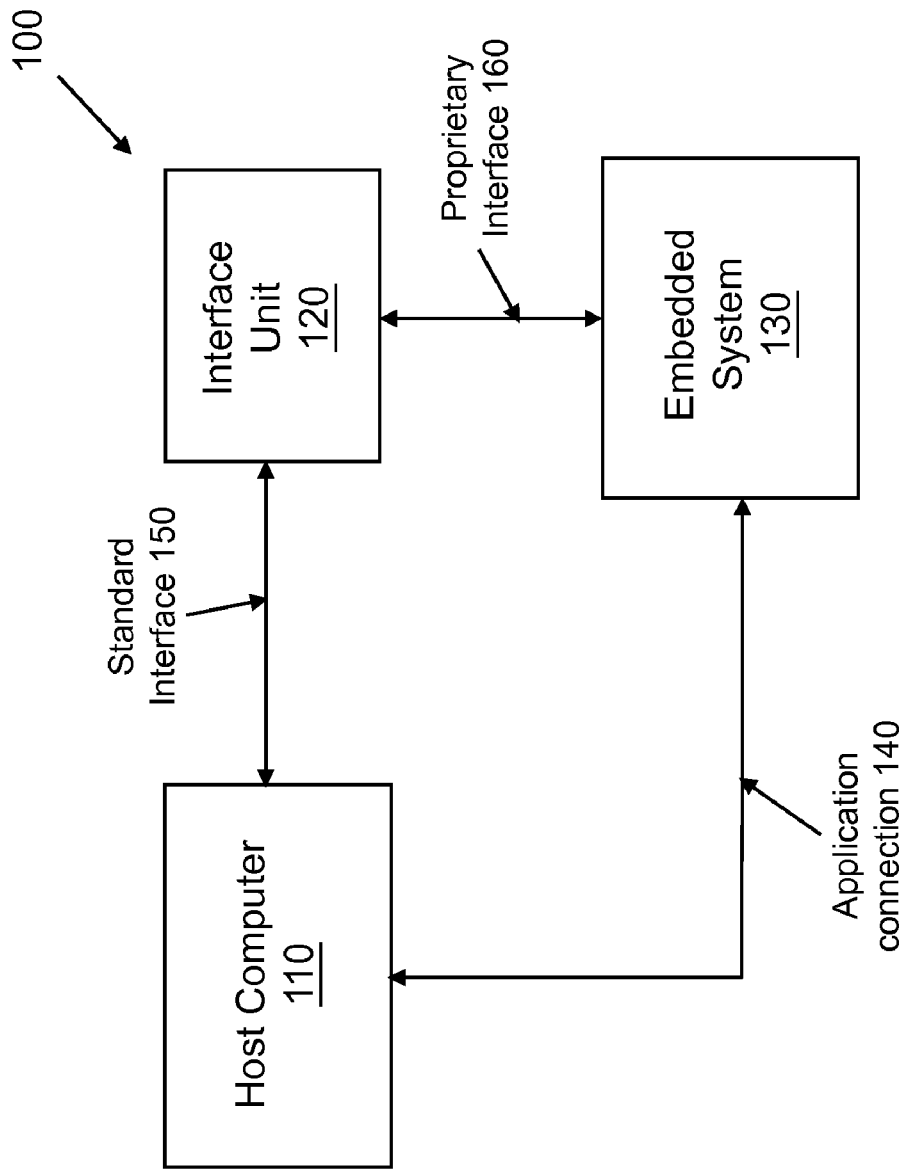
FIG. 1 is a block diagram of a conventional system for software development and debugging for embedded systems.
Figure 2:
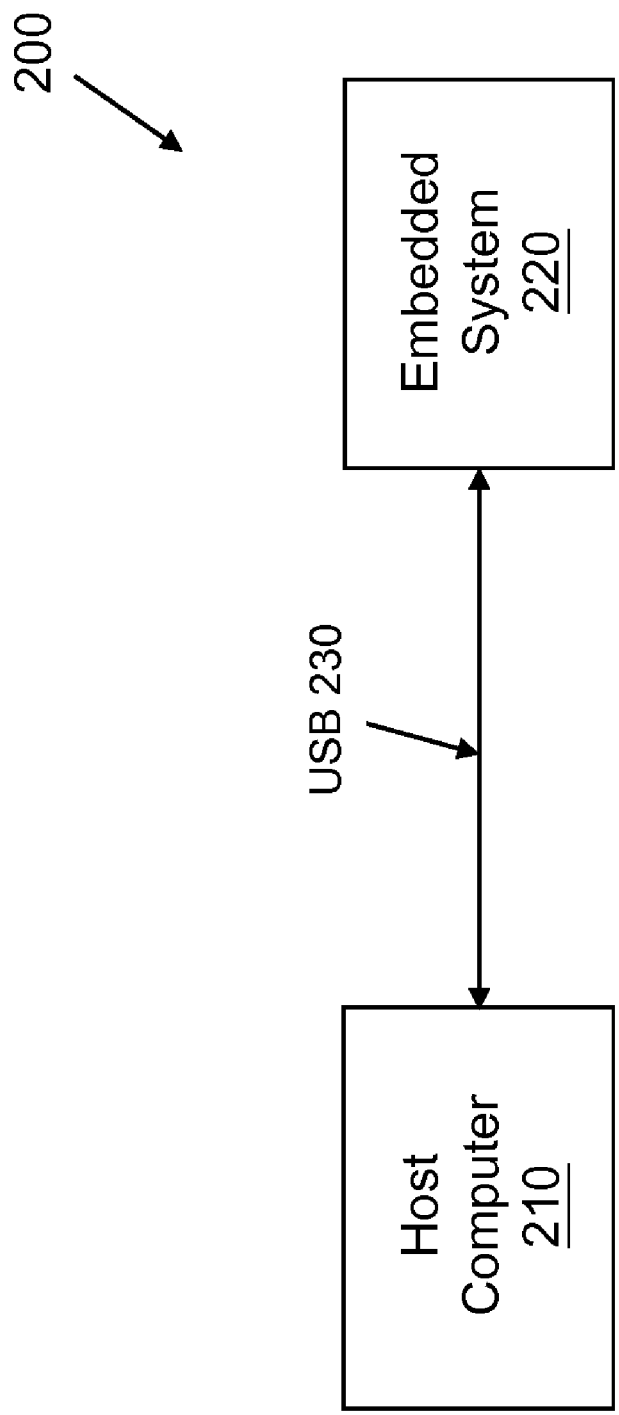
FIG. 2 is a block diagram of an improved system for software development and debugging for embedded systems in accordance with the present invention.

Referring to FIG. 2, an improved system 200 for software development and debugging for an embedded system includes a host computer 210 and an embedded system 220. The embedded system 220 has a built-in USB connection, which is used for transferring application data for developing the embedded applications as well as for debugging purposes. As described in details below, the host computer 210 and the embedded system 220 are so configured to allow the application and the debugging channels to be multiplexed in a single USB 230. In comparing to the convention systems, the improved system 200 is simplified by the removal of the interface unit. Another advantage is that the embedded system is no longer required to have I/O pins for the debugging channel (e.g. via an interface unit). The I/O pins can thus be re-allocated for other purposes. This reduction in I/O pins can be of significant importance in embedded systems with low I/O pin count.

Figure 3:
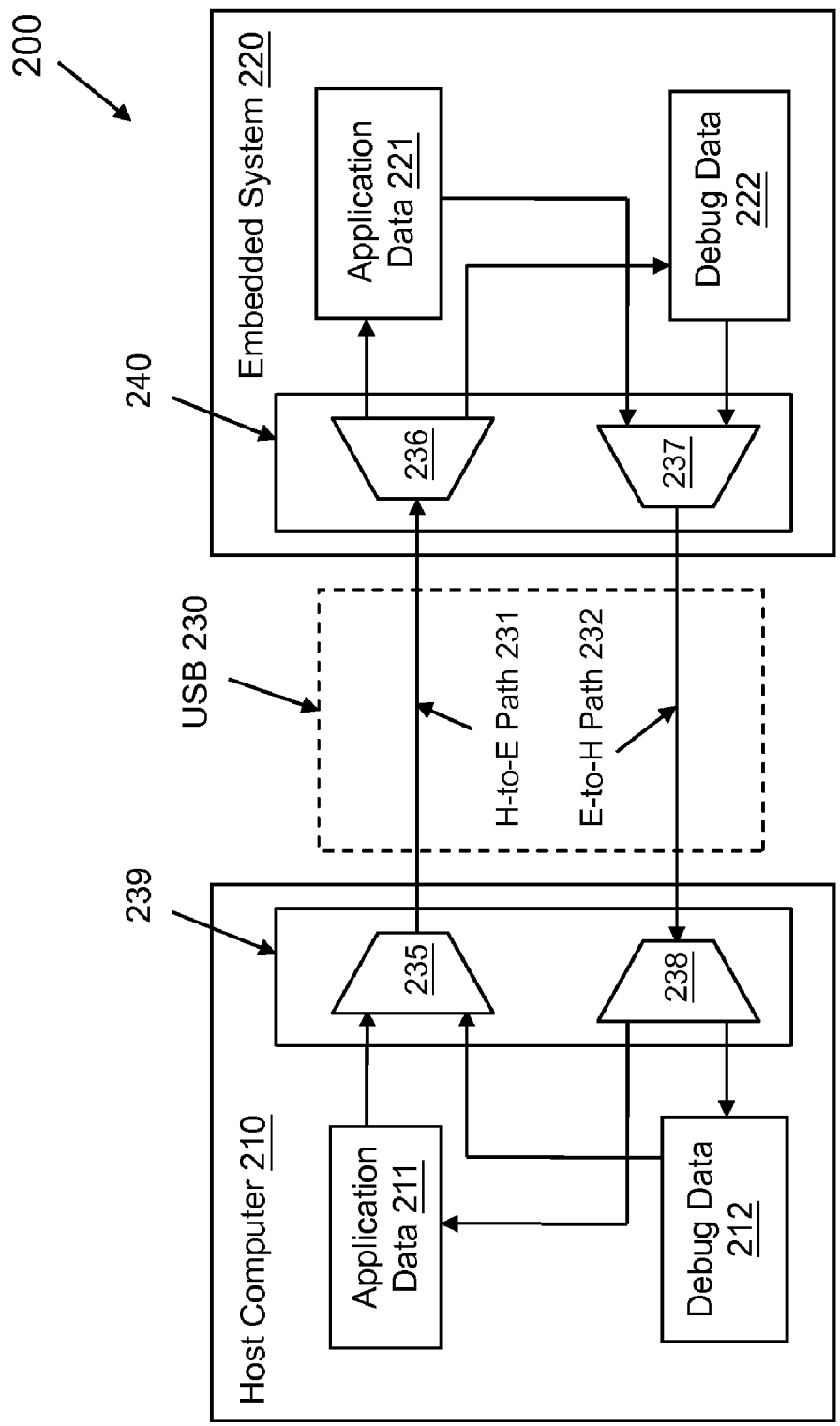
FIG. 3 illustrates data flows and data multiplexing in the improved system in FIG. 2.

Referring to FIG. 3, the communications between the host computer 210 and the embedded system 220 involve two types of data: application data 211, 221 for the development of the embedded software applications, and debug data 212, 222, which are transmitted in two data channels. Debug data from the host computer to the embedded system can for example include commands like stop, read/write memory/registers etc. Debug data from the embedded system to the host computer can include information like status of the embedded system, content of memory locations/registers, etc. In the improved system 200, the two types of data are multiplexed on the single USB 230. In the direction from the host computer 210 to the embedded system 220, the application data 211 and the debug data 212 in the host computer are first combined by a multiplexer 235 and then transmitted via the H-to-E path 231 in the USB 230. The combined data are then separated by a demultiplexer 236 into two channels, the application data 221 and the debug data 222 on the embedded system 220. In the reverse direction from the embedded system 220 to the host computer 210, the application data 221 and the debug data 222 are combined by a multiplexer 237 and transmitted in the E-to-H path 232. The combined data is separated by a demultiplexer 238 on the host computer 210 in to the application data 211 and debug data 212. The multiplexer 235 and the demultiplexer 238 can be together called a multiplexing function 239. The multiplexer 237 and the demultiplexer 236 can be together called a multiplexing function 240. It should be noted that the multiplexers 235, 237, the demultiplexers 236, 238, and the multiplexing functions 239, 240 are meant to represent are logic functions for controlling the data flows instead of specific hardware or software modules. In implementations, as described below, the multiplexing and demultiplexing functions are combined with other functions (such as USB driver) in relevant hardware or software modules.

Figure 4:
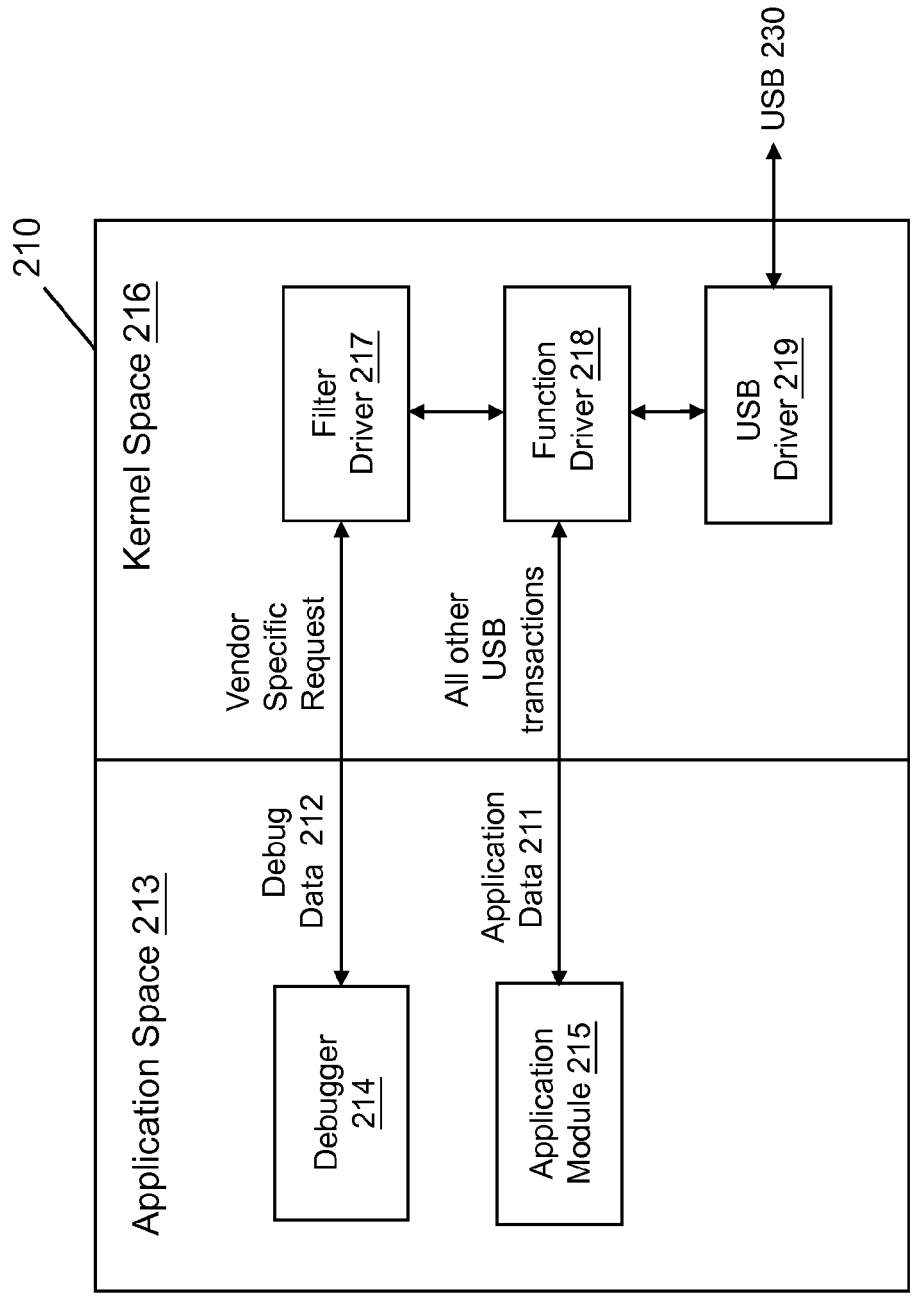
FIG. 4 is a block diagram illustrates data multiplexing in the host computer shown in the improved system in FIG. 2.

FIG. 4 illustrates more details of the data multiplexing in the host computer 210 in the improved system 200. The data processing in the host computer 210 is separated into the application space 213 and the kernel space 216. The application space 213 includes a debugger 214 and an application module 215. The kernel space 216 includes a filter driver 217, a function driver 218, and a USB driver 219. The filter driver 217, the function driver 218, and the USB driver 219 together perform the functions of the multiplexing function 239 (in FIG. 3). USB protocols define vendor specific requests and other types of USB requests. To separate the debug data 212 from the application data 211, the debug data 212 are sent in vendor specific device requests through the USB 230 to and from embedded system 220 (not shown). The application data 211 are sent in other types (non-vendor specific) of USB transaction.

The USB driver 219 is interfaced with the USB 230 and handles both types of requests and thus the transfers of the application data 211 and the debug data 212 between the host computer 210 and the embedded system 220. The function driver 218 handles all USB transactions (i.e. the application data 211) other than the vendor specific requests to the application module 215 between the USB driver 219 and the application module 215. The vendor specific device requests are passed through the function driver 218. The filter driver 217 is defined in the improved system 200 to handle vendor specific device requests between the debugger 214 and the function driver 218.

Figure 5:
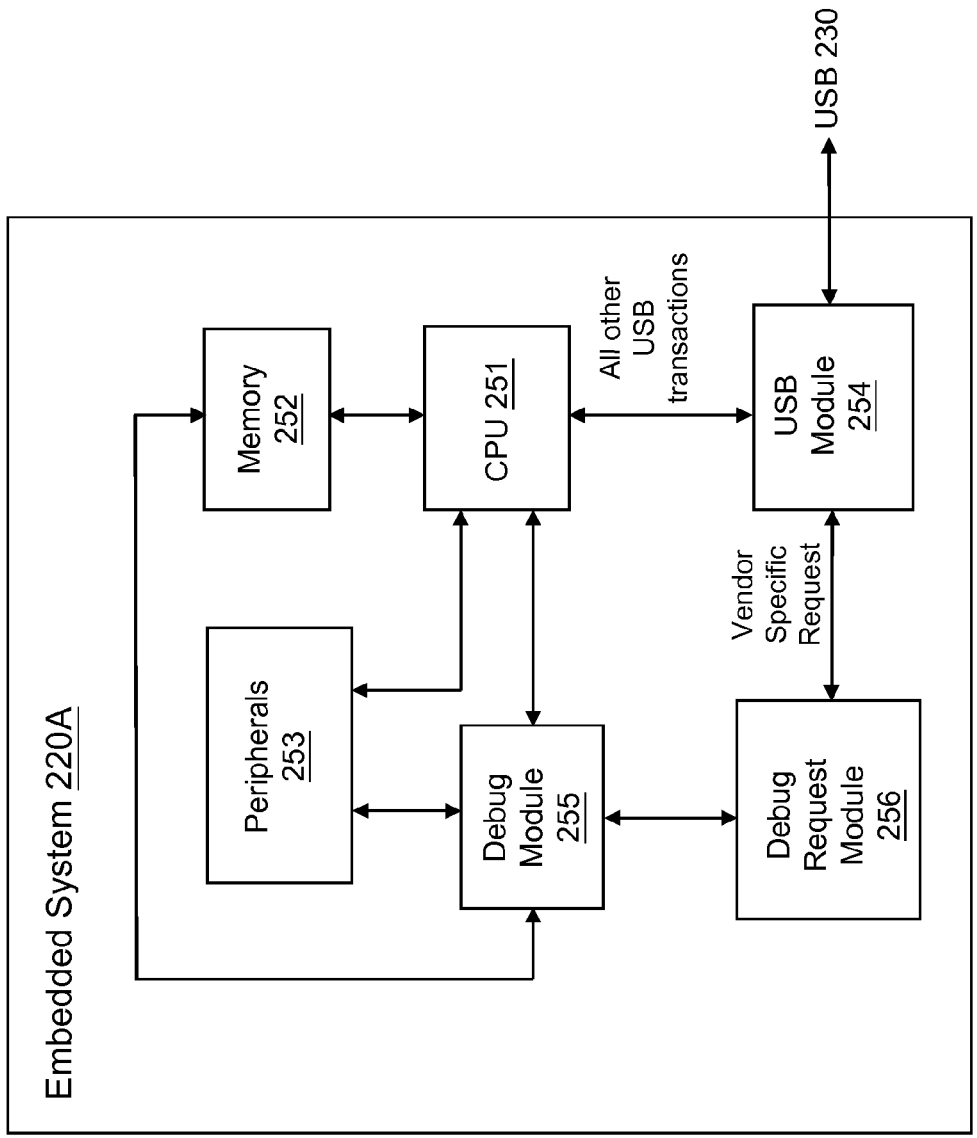
FIG. 5 is a block diagram for data multiplexing in an embedded system of FIGS. 2 and 3 that has hardware modules.
Figure 6:
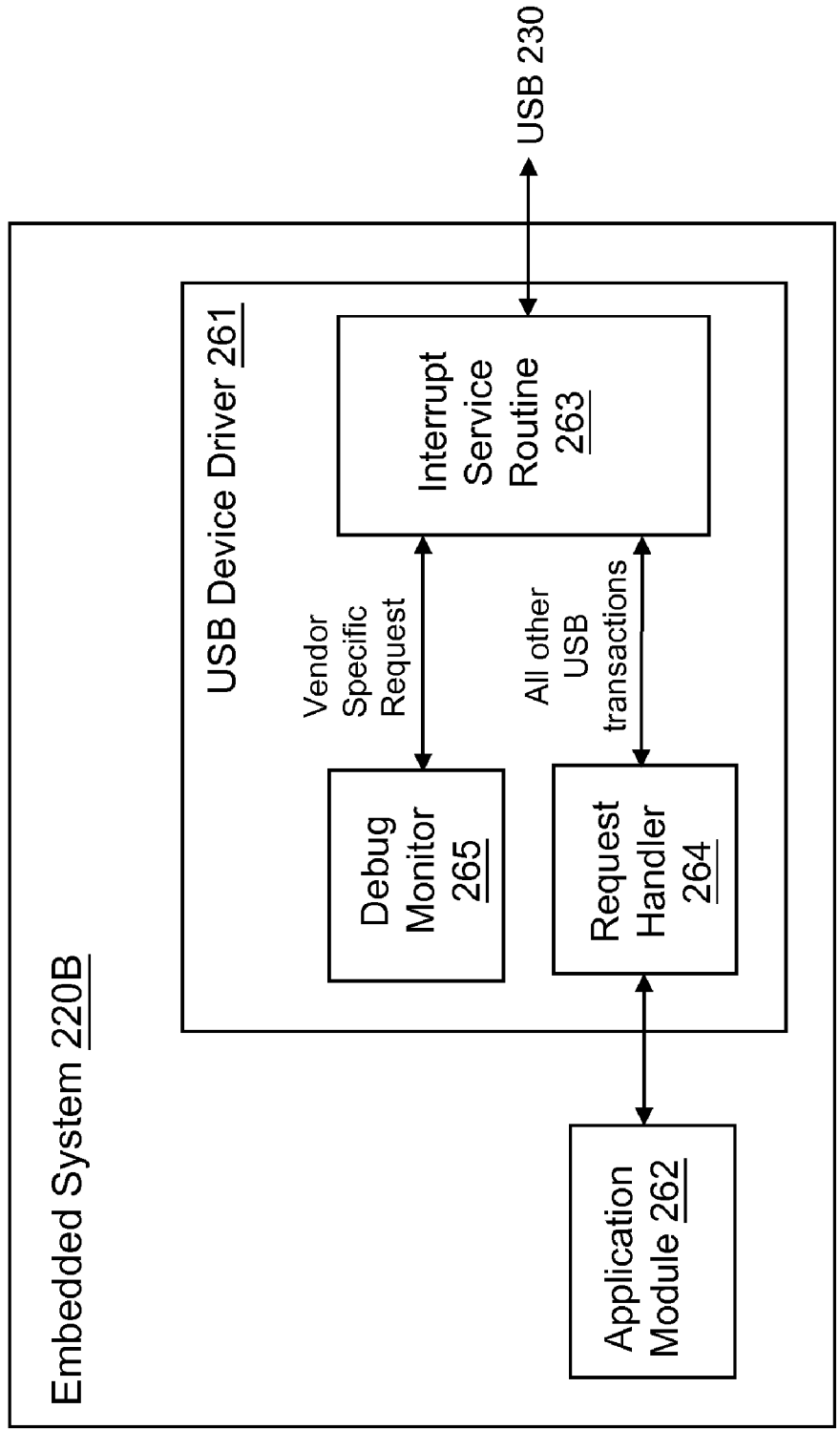
FIG. 6 is a block diagram for data multiplexing in an embedded system of FIGS. 2 and 3 that does not include hardware modules.

In accordance with the present invention, the embedded system 220 can handle multiplexing with or without a hardware module. FIGS. 5 and 6 illustrate data multiplexing in an embedded system 220A with a hardware module and an embedded system 220B without a hardware module. The embedded systems 220A, 220B are compatible with the embedded system 220.

Referring to FIG. 5, the embedded system 220A includes a central processing unit (CPU) 251, a memory 252, peripherals 253, a USB module 254 that is interfaced with the USB 230, a debug module 255, and a debug request module 256. The USB module 254, the debug module 255, and the debug request module 256 are hardware modules. The application for the embedded system is stored in the memory 252, and is executed by the CPU 251 to produce the application data or in response to the application data. The application data is transmitted between the CPU 251 and the USB module 254, which in turn communicates with the host computer 210 (FIGS. 2-4) via the USB 230 connection in transactions other than the vendor specific requests.

The debug request module 256 interfaces the USB module 254 and the debug module 255 and handles USB data multiplexing in conjunction with the USB module 254 (the multiplexing function 240 in FIG. 3). When a vendor specific request is received from the host computer 210 (FIGS. 2-4), the USB module 254 sends related command/data to the debug request module 256. The debug request module 256 can translate the vendor specific requests into corresponding debug commands and sends to the debug module 255. The debug module 255 then performs appropriate action (such as stopping the CPU, read/write registers or in the memory 252, etc). The debug module 255 processes the debug data and can produce additional debug data to be sent to the host computer 210. The debug request module 256 can also translate debug messages from the debug module 255 into vendor specific requests to be sent to the USB module 254, which in turn are sent to the host computer 210.

Referring to FIG. 6, the embedded system 220B does not include a hardware module. Instead the data multiplexing is implemented by software applications. The embedded system 220B includes a USB device driver 261 and a software application module 262 that is being developed. The USB device driver 261 includes an interrupt service routine 263 that is interfaced with the USB 230, a request handler 264, and a debug monitor 265. For embedded systems without a hardware debug module, the USB device driver 261 handles all data transfers to and from the PC through the USB bus.

The interrupt service routine 263 handles communications with the host computer 220 (FIGS. 2-4) and the data multiplexing (the multiplexing function 240 in FIG. 3). Application data are contained in the other USB transactions that the interrupt service routine 263 directs to the request handler 264, which in turn communicates with the application module 262. The application module 262 is configured to execute an application to produce the application data or in response to the application data. The interrupt service routine 263 interacts with the debug monitor 265 for vendor specific requests to be sent to or received from the host computer 220 (FIGS. 2-4). The data transfers related to these requests are directed to be handled by the debug monitor 265. The debug monitor 265 is configured to process and produce the debug data. The application module 262 is shielded from such debugging related vendor specific requests.

Figure 7:
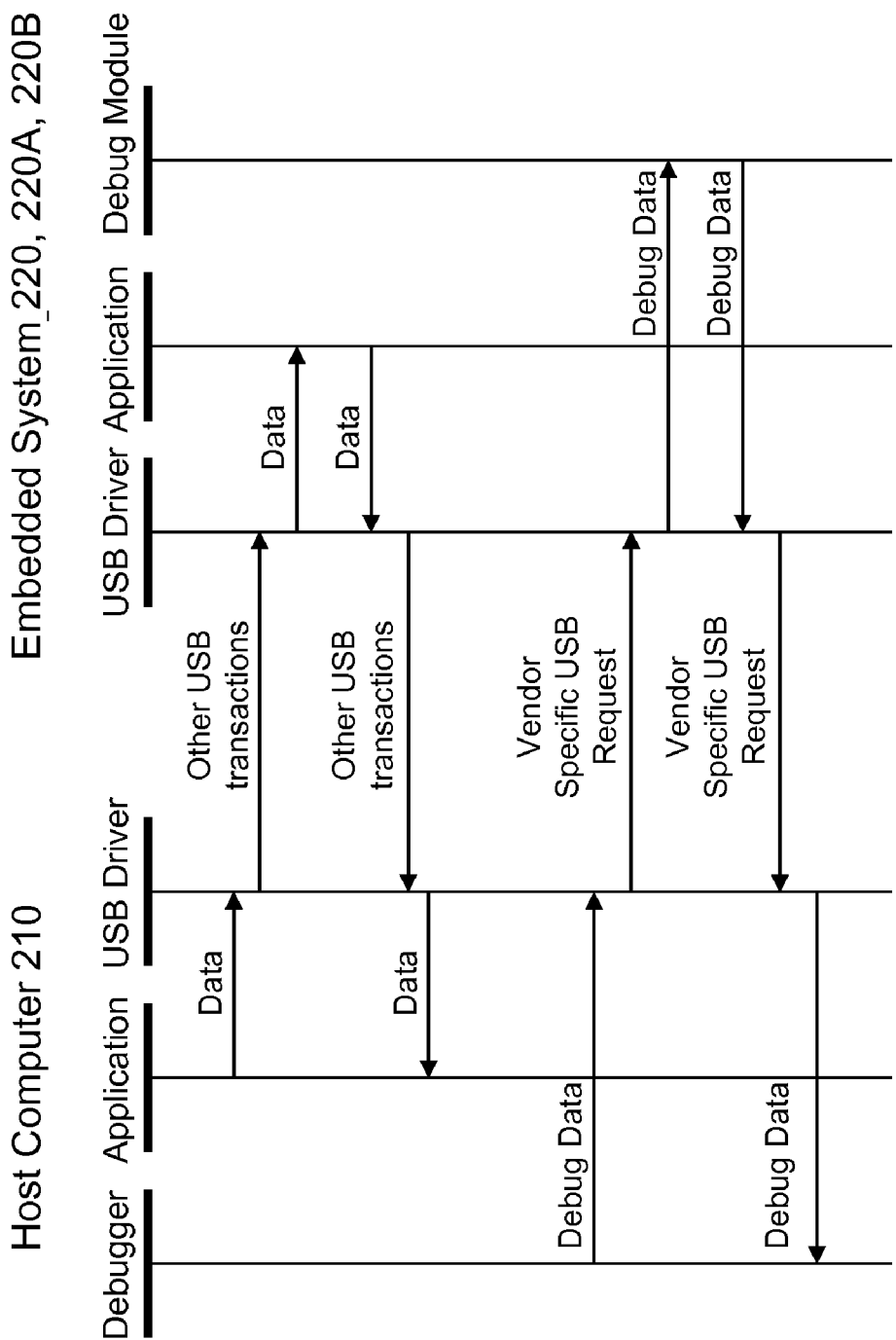
FIG. 7 illustrates data flows between the host computer and the embedded system in FIGS. 2-6.

FIG. 7 illustrates in more detail data flows between the host computer 210 and the embedded system 220, 220A, 220B in the improved system 200 (FIGS. 2-6). The host computer 210 includes three functional layers: a USB driver, application, and debugger. The embedded system 220, 220A, or 220B also includes three similar function layers: a USB driver, application, and debug module. The application data are communicated between the application layers in the host computer 210 and in the embedded system 220, 220A, or 220B. The application data are transmitted in USB transactions other than vendor specific type requests between the USB drivers. The debug data are communicated between the debugger layer in the host computer 210 and the debug module in the embedded system 220, 220A, or 220B. The debug data are transmitted in vendor specific type requests between the USB drivers.

It is understood that the disclosed circuit and methods are compatible with other configurations of the electronic components and variations in circuit designs without deviation from the spirit of the present specification. For example, the exact layout and connectivity of the hardware and the software modules for data multiplexing may vary without deviating from the present invention. The disclosed improved system can be applied to a wide range of embedded systems such as micro controllers for a mass storage device, web cameras, USB speaker, docks for smart phones, USB hub, USB card reader, etc. The disclosed systems and methods are compatible with different USB standards such as USB 1.x, USB 2.0, USB 3.0, Type A, Type B, Mini-A, Mini-B, Micro-AB, Micro-B, etc.

The disclosed system can significantly simplify the hardware requirements and improve efficiency for software development and debugging for embedded systems. The disclosed system no longer requires the embedded system to have dedicated I/O pins for a debugging channel. The I/O pins can thus be re-allocated for other purposes and reduced, which can be especially significant for embedded systems with low I/O pin count.

What is claimed is:

1. A computer system for software development and debugging for an embedded system, comprising:
   a Universal Serial Bus (USB);
   a host computer comprising a USB driver interfaced with the USB, wherein the USB driver is configured to multiplex application data and debug data to and from the USB; and
   an embedded system comprising a hardware USB module interfaced with the USB, wherein the USB module is configured to multiplex the application data and the debug data to and from the host computer via the USB.

2. The computer system of claim 1, wherein the host computer further comprises:
   a debugger in communication with the USB driver, the debugger being configured to transmit the debug data to and from the USB driver.

3. The computer system of claim 2, wherein the debugger is configured to transmit the debug data to and from the USB driver in vendor specific requests defined in USB protocols.

4. The computer system of claim 2, wherein the host computer further comprises:
   a filter driver in communication with the USB driver, the filter driver being configured to direct the debug data to and from the debugger.

5. The computer system of claim 1, wherein the host computer further comprises:
   an application module in communication with the USB driver, the application module being configured to transmit the application data to and from the USB driver.

6. The computer system of claim 5, wherein the application module is configured to transmit the application data to and from the USB driver in USB transactions other than vendor specific requests defined in USB protocols.

7. The computer system of claim 5, wherein the host computer comprises:
   a function driver in communication with the USB driver, the function driver being configured to direct the application data to and from the application module.

8. The computer system of claim 1, wherein the embedded system comprises:

a debug module in communication with the USB module, the debug module being configured to transmit the debug data to and from the USB module.

9. The computer system of claim 8, wherein the debug module is configured to transmit the debug data to and from the USB module in vendor specific requests defined in USB protocols.

10. The computer system of claim 9, wherein the embedded system comprises:
a debug request module in communication with the USB module and the debug module, wherein the debug request module is configured to translate the vendor specific requests received from the USB module into debug commands and send the debug commands to the debug module, wherein the debug request module is configured to translate debug messages from the debug module into vendor specific requests to be sent to the USB module.

11. The computer system of claim 1, wherein the embedded system further comprises:
a central processing unit configured to transmit the application data to and from the USB module, wherein the central processing unit is configured to execute an application to produce the application data or execute an application in response to the application data.

12. A computer system for software development and debugging for an embedded system, comprising:
a host computer comprising:
a Universal Serial Bus (USB) driver interfaced with a USB and configured to multiplex application data and debug data to and from the USB;
a debugger in communication with the USB driver, the debugger being configured to transmit the debug data to and from the USB driver; and
an application module in communication with the USB driver, the application module being configured to transmit the application data to and from the USB driver; and an embedded system comprising:
a USB module interfaced with the USB, wherein the USB module is configured to multiplex the application data and the debug data to and from the host computer via the USB;
a debug module configured to transmit the debug data to and from the USB module, the debug module being configured to process or produce the debug data; and
a central processing unit configured to transmit the application data to and from the USB module, wherein the central processing unit is configured to execute an application to produce the application data or execute an application in response to the application data.

13. The computer system of claim 12, wherein the debugger is configured to transmit the debug data to and from the USB driver in vendor specific requests defined in USB protocols, wherein the application module is configured to transmit the application data to and from the USB driver in USB transactions other than vendor specific requests defined in USB protocols.

14. The computer system of claim 12, wherein the debug module in the embedded system is configured to transmit the debug data to and from the USB module in vendor specific requests defined in USB protocols.

15. The computer system of claim 14, wherein the embedded system comprises
a debug request module in communication with the USB module and the debug module, wherein the debug request module is configured to translate the vendor specific requests received from the USB module into debug commands and send the debug commands to the debug module, wherein the debug request module is configured to translate debug messages from the debug module into vendor specific requests to be sent to the USB module.

\* \* \* \* \*